United States Patent
Multerer et al.

(10) Patent No.: US 7,803,052 B2
(45) Date of Patent: Sep. 28, 2010

(54) DISCOVERY AND DISTRIBUTION OF GAME SESSION INFORMATION

(75) Inventors: Boyd C. Multerer, Seattle, WA (US); Darren L. Anderson, Bellevue, WA (US); Mark D. VanAntwerp, Redmond, WA (US); Dinarte R. Morais, Redmond, WA (US); Paul E. Newson, Kirkland, WA (US); Mitsuo Koikawa, Minato-ku (JP)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 10/184,225

(22) Filed: Jun. 28, 2002

(65) Prior Publication Data

US 2004/0002384 A1   Jan. 1, 2004

(51) Int. Cl.
*A63F 9/24*   (2006.01)
*A63F 13/00*   (2006.01)
*G06F 17/00*   (2006.01)
*G06F 19/00*   (2006.01)

(52) U.S. Cl. ...................................................... 463/42
(58) Field of Classification Search .................. 463/29, 463/42, 43, 30, 37
See application file for complete search history.

(56) References Cited

U.S. PATENT DOCUMENTS

| | | | | |
|---|---|---|---|---|
| 5,586,257 A * | 12/1996 | Perlman | ...................... | 463/42 |
| 5,724,425 A * | 3/1998 | Chang et al. | .................. | 705/52 |
| 5,828,843 A * | 10/1998 | Grimm et al. | ............... | 709/228 |
| 6,005,565 A * | 12/1999 | Legall et al. | ................. | 715/721 |
| 6,058,431 A * | 5/2000 | Srisuresh et al. | ............ | 709/245 |
| 6,312,336 B1 * | 11/2001 | Handelman et al. | ........... | 463/40 |
| 6,345,297 B1 * | 2/2002 | Grimm et al. | ............... | 709/227 |
| 6,352,479 B1 * | 3/2002 | Sparks, II | ..................... | 463/42 |
| 6,468,160 B2 * | 10/2002 | Eliott | .......................... | 463/43 |
| 6,530,840 B1 * | 3/2003 | Cuomo et al. | ................. | 463/42 |
| 6,599,194 B1 * | 7/2003 | Smith et al. | ................... | 463/30 |
| 6,699,125 B2 * | 3/2004 | Kirmse et al. | ................. | 463/42 |
| 6,712,704 B2 | 3/2004 | Eliott | | |

(Continued)

FOREIGN PATENT DOCUMENTS

EP        0 714 684        6/1996
WO     WO 97/10561       3/1997

OTHER PUBLICATIONS

"Phantasy Star Online Perfect Guide", SOFTBANK Publishing Inc., 2001, 9 pgs.

(Continued)

*Primary Examiner*—Kesha Y. Frisby
(74) *Attorney, Agent, or Firm*—Lee & Hayes, PLLC

(57) ABSTRACT

Discovery and distribution of game session security information includes receiving a request to generate a new game session from a computing device and maintaining a record of a game session identifier for the new game session and a game session key for the new game session, and making the new game session available for other computing devices to join. A request for information describing one or more of a plurality of game sessions may also be received and responded to with the information describing the one or more game sessions as well as a session key that can be used to communicate with at least one of the one or more other computing devices that are part of the game session.

28 Claims, 13 Drawing Sheets

U.S. PATENT DOCUMENTS

| | | | |
|---|---|---|---|
| 6,755,743 | B1 * | 6/2004 | Yamashita et al. ............ 463/42 |
| 6,769,989 | B2 | 8/2004 | Smith et al. |
| 7,031,473 | B2 * | 4/2006 | Morais et al. ............... 380/251 |
| 7,370,194 | B2 | 5/2008 | Morais et al. |
| 7,640,300 | B2 | 12/2009 | Wohlgemuth et al. |
| 7,650,495 | B2 | 1/2010 | Morais et al. |
| 2002/0071557 | A1 * | 6/2002 | Nguyen ...................... 380/251 |
| 2002/0077177 | A1 * | 6/2002 | Elliott ......................... 463/40 |
| 2002/0126846 | A1 * | 9/2002 | Multerer et al. ............. 380/251 |
| 2002/0133707 | A1 * | 9/2002 | Newcombe ................ 713/183 |
| 2003/0069071 | A1 * | 4/2003 | Britt et al. .................... 463/42 |
| 2003/0093669 | A1 * | 5/2003 | Morais et al. ............... 713/163 |
| 2003/0228908 | A1 * | 12/2003 | Caiafa et al. ................. 463/42 |
| 2003/0233537 | A1 * | 12/2003 | Wohlgemuth et al. ....... 713/151 |
| 2004/0009815 | A1 * | 1/2004 | Zotto et al. ................... 463/42 |
| 2004/0059711 | A1 * | 3/2004 | Jandel et al. ................... 707/1 |
| 2004/0162137 | A1 | 8/2004 | Eliott |

OTHER PUBLICATIONS

English translation of Official Notice of Rejection from the Japanese Patent Office for Application No. 2003-188928, mailed on Mar. 25, 2008, 5 pgs.

English translation of Official Notice of Rejection from the Japanese Patent Office for Application No. 2003-188928, mailed on Nov. 28, 2008, 4 pages.

Weiler, et al; "Secure and Anonymous Multicast Framework"; Communications and Multimedia Security Issues of the New Century; IFIP TC6/TC11 Fifth Joint Working Conference on Communications and Multimedia Security (CSM'01) pp. 39-51; May 21-22, 2001.

Yan, et al; "Security Issues in Online Games"; Electronic Library, 2002 V. 20, N. 2, pp. 125-133.

Mok; "Wireless Online Games"; Electronic Library, 2002, V. 20, N. 2, pp. 113-118.

SMED, et al; "Aspects of Networking in Multiplayer Computer Games"; Electronic Library, 2002, V. 20, N. 2, pp. 87-97.

"Microsoft Unveils a More User-Friendly MSN Gaming Zone"; Microsoft PressPass, Aug. 31, 1999, 2 pages.

"Microsoft Boosts Accessibility to Internet Gaming Zone with Latest Release"; Microsoft PressPass, Apr. 27, 1998, 2 pages.

Cox, "Online and Multiplayer gaming-an Overview"; Virtual Reality; Virtual Reality (UK); vol. 5, No. 4, pp. 215-222; Oct. 25, 2000.

Gamasutra; "Cyberspace in the 21st Century: Scalability With a Big "S""", Gamasutra.com, Feb. 26, 2001; 16 pages; www.gamasutra.com/features/20010226/fitch_01.htm.

"Realization method of flexible private network system", Okazaki et al., Institution of Electrical Engineers Stevenage, Sep. 2000, XP-002279234, Abstract, 1 page.

European Search Report for European Patent Application No. EP 03 01 2059, dated Jun. 17, 2004, 3 pages.

* cited by examiner

390

| |
|---|
| RESULT LENGTH |
| SESSION ID (XNKID) |
| HOST ADDRESS (XNADDR) |
| KEY EXCHANGE KEY (XNKEY) |
| AVAILABLE PUBLIC SLOTS |
| AVAILABLE PRIVATE SLOTS |
| CURRENTLY FILLED PUBLIC SLOTS |
| CURRENTLY FILLED PRIVATE SLOTS |
| NUMBER OF ADDITIONAL ATTRIBUTES |
| ATTRIBUTE 1 OFFSET |
| ATTRIBUTE 2 OFFSET |
| ● ● ● |
| ATTRIBUTE $d$ OFFSET |

Fig. 12

DISCOVERY AND DISTRIBUTION OF GAME SESSION INFORMATION

TECHNICAL FIELD

This invention relates to game consoles, and particularly to discovery and distribution of game session information.

BACKGROUND

Traditionally, gaming systems with a dedicated console were standalone machines that accommodated a limited number of players (e.g., 2-4 players). Personal computer-based gaming grew in popularity in part due to the ability to play games online with many remote players over the Internet. Thus, one trend for dedicated gaming consoles is to provide capabilities to facilitate gaming over a network, such as Internet-based online gaming.

Network-based or online gaming can be implemented in a centralized-server approach or a peer-to-peer approach. In the centralized-server approach, gaming systems connect to one or more centralized servers and interact with one another via this centralized server(s). In the peer-to-peer approach, gaming systems connect to one another and interact with one another directly. However, even in the peer-to-peer approach, a centralized server(s) may be employed to assist in the communication.

One problem encountered in employing such a centralized server(s) is to protect network traffic between the gaming systems from tampering or observation by other devices on the network. Gamers are notorious for developing creative cheating mechanisms, making the network traffic a ripe target for such users. Unfortunately, previous console-based gaming systems typically did not provide for secure communications with one another.

The discovery and distribution of game session information described below solves these and other problems.

SUMMARY

Discovery and distribution of game session information is described herein.

According to one embodiment, a request to generate a new game session is received from a computing device. A record of a game session identifier for the new game session and a game session key for the new game session are maintained, and the new game session is made available for other computing devices to join.

According to another embodiment, a request is received from a computing device for information describing one or more of a plurality of game sessions that are being hosted by one or more other computing devices and that are currently available for play. The request is responded to with the information describing the one or more game sessions as well as a session key that can be used to communicate with at least one of the one or more other computing devices that are part of the game session.

According to yet another embodiment, an identifier of a location where game data is stored is received from a computing device. A record of the location and a game session key are maintained, and the game data location and game session key are made available to other computing devices.

BRIEF DESCRIPTION OF THE DRAWINGS

The same numbers are used throughout the document to reference like components and/or features.

FIG. 12 illustrates an exemplary message structure for communicating a response to a game session search request.

DETAILED DESCRIPTION

The discussion herein assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Figure 1:
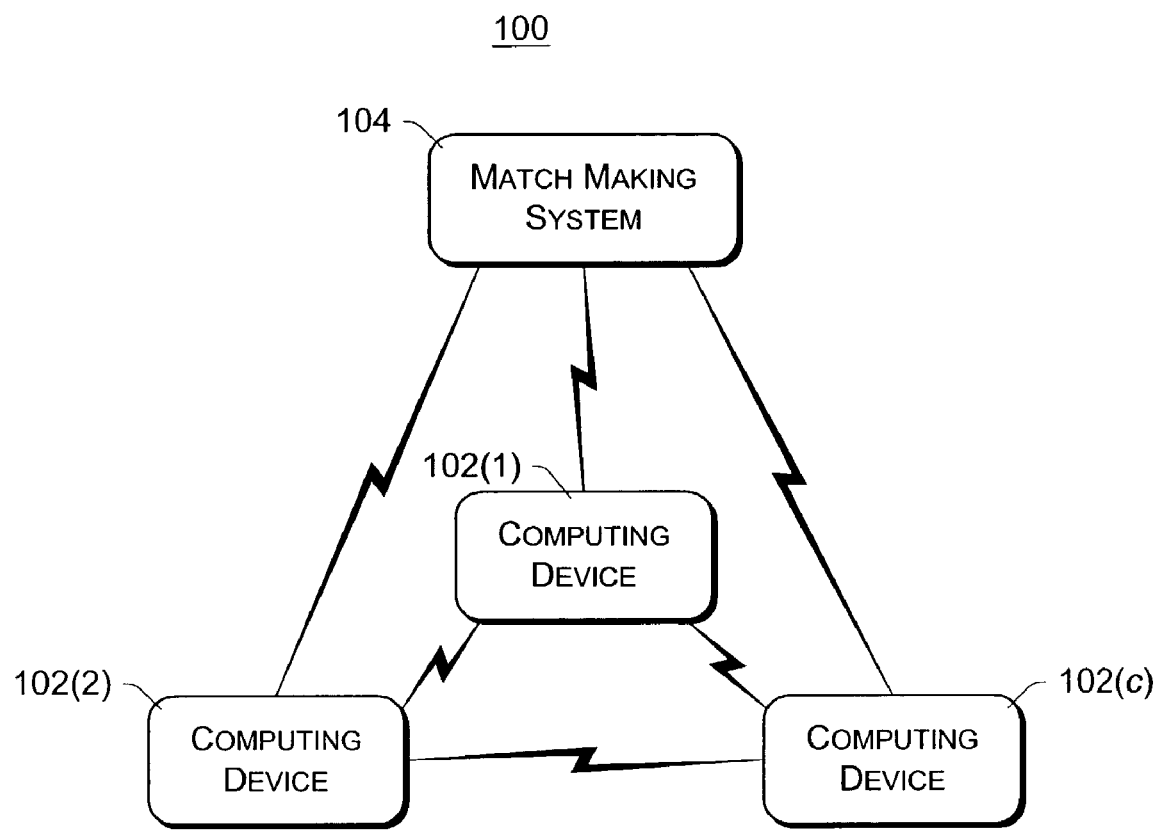
FIG. 1 is a block diagram of an exemplary environment in which the discovery and distribution of game session information can be used.

FIG. 1 is a block diagram of an exemplary environment 100 in which the discovery and distribution of game session information can be used. Multiple computing devices 102(1), ..., 102(c) are coupled to a match making system 104. The coupling between devices 102 and system 104, as well as between devices 102, can be any of a variety of couplings allowing communication between system 104 and each of devices 102 and/or between devices 102. In one implementation, the coupling includes the Internet, and may also optionally include one or more other networks (e.g., a local area network (LAN) or wide area network (WAN)). For example, each of computing devices 102 may be situated on a home-based LAN and each home-based LAN coupled to system 104 via the Internet. The couplings can be implemented using any of a variety of network types and technologies, including wire and/or wireless networks.

Computing devices 102 allow their respective users to play games with one another. Online gaming typically refers to two or more game consoles communicating with one another to allow the user(s) of the consoles to play games with one another. This communicating is typically performed over the Internet, but could alternatively be over other networks as well (in place of or in addition to the Internet).

Match making system 104 maintains information about multiple game sessions being hosted by the computing devices 102, allowing players to search for game sessions, create new game sessions, join game sessions, quit game sessions, and obtain information used by the computing devices to communicate data to one another. The hosting device of a game session is the device responsible for initiating a game session, such as by having match making system 104 (or alternatively some other device) create a new game session. A game session refers to one instance of a game title including one or more players. When all players of the game session have ended the session (e.g., quit the game session, logged out of system 104, powered-down their devices, etc.), then the game session ends. A game session can include multiple rounds of play, or alternatively a new game session may be created for each round of play. Information regarding multiple game sessions for each of multiple different game titles can be maintained by system 104 concurrently. Players can leave (quit) a game session and join a game session. Once the session reaches a particular point in the gameplay, the ability to join the session can be restricted, or alternatively players may be able to join and leave the game session at will during gameplay, so that the players at the end of the game session can be different than the players at the beginning of the game session. Restrictions on the ability to join and leave the game session can vary by game title, based on the desires of the game title designer.

When a player using a computing device joins a game session, that computing device is also referred to as joining the game session. The device being used by each player that is playing a game session is also referred to as a member of the game session.

Computing device 102 can be a dedicated game console, a game console incorporating additional functionality (e.g., digital video recording functionality so that it can operate as a digital VCR, channel tuning functionality so that it can tune and decode television signals (whether they be broadcast signals, cable signals, satellite signals, etc.), and so forth), a desktop PC, a workstation, a portable computer, a cellular telephone, an Internet appliance, a server computer, etc. Additionally, different types of devices 102 may use match making system 104 concurrently. For example, a user on a dedicated game console may join a game session and play against a user on a portable computer, or a user on a dedicated game console manufactured by one manufacturer may join a game session and play against a user on a dedicated game console manufactured by another manufacturer.

Figure 2:
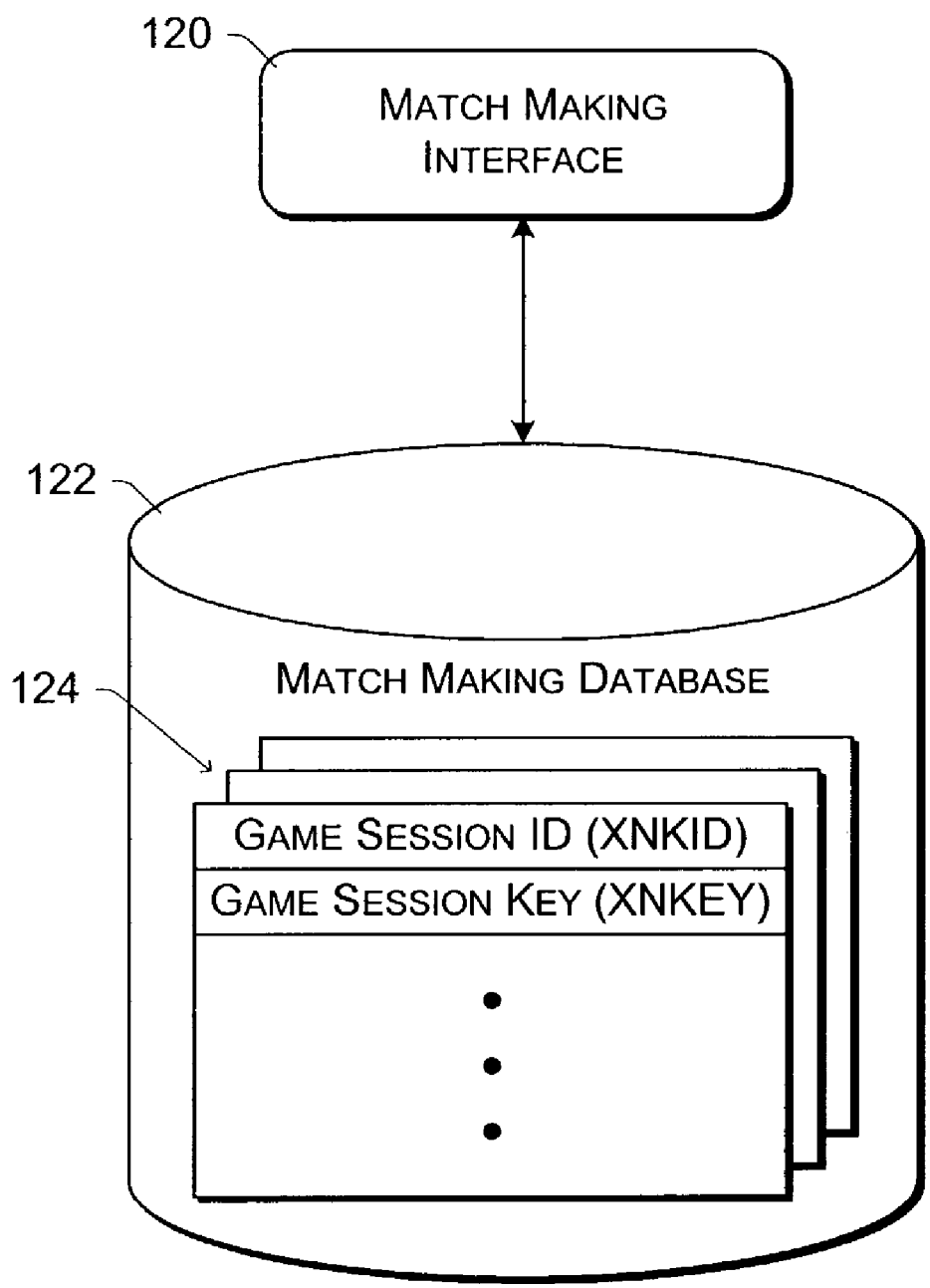
FIG. 2 is a block diagram illustrating an exemplary match making system in additional detail.

FIG. 2 is a block diagram illustrating an exemplary match making system 104 in additional detail. Match making system 104 includes a match making interface 120 and a match making database 122. Match making interface 120 receives requests regarding creating, joining, quitting, searching, etc. game sessions. When such a request is received, match making interface 120 generates the appropriate commands to be issued to match making database 122 in order to carry out the request. Alternatively, match making interface 120 may simply forward the requests to match making database 122.

Match making database 122 maintains multiple records 124 storing information regarding the various game sessions that are currently being managed by match making system 104. The game sessions managed by match making system 104 are typically those game sessions that are created by match making system 104. Some game sessions managed by match making system 104 may be open and thus additional players can join the sessions, while other game sessions may be closed and thus additional players cannot join the sessions. The records 124 can be maintained using any of a variety of data structures. In one exemplary implementation, the information regarding each game session is stored as an entry in one of one or more tables.

Match making system 104 is designed to facilitate establishing of game sessions between or among computing devices. In most of the discussions herein, match making system 104 is described as managing game sessions but not managing the transfer of data between or among the member devices of the game session. Rather, the computing devices transfer the data between or among themselves, or via another server device (not shown in FIG. 2). Alternatively, some game data transfer may occur via match making system 104.

A variety of different information can be maintained in records 124 for each game session. In one implementation, this information includes at least a game session ID (XNKID) and a game session key (XNKEY). The game session ID uniquely identifies a particular game session managed by match making system 104. The game session key is a cryptographic key associated with the game session. This cryptographic key is made available to all of the members of the game session, and is used by the members of the game session to securely communicate data to one another. It should be noted that an additional key may be used by each of the computing devices to communicate securely with match making system 104; however, this additional key(s) is different than the game session key illustrated in FIG. 2.

The game session ID as well as the game session key can be generated by match making system 104 or the hosting computing device 102. Alternatively, one of the game session ID and the game session key may be generated by match making system 104 and the other generated by the hosting computing device 102.

Although a single database 122 is illustrated in FIG. 2, it is to be appreciated that the records maintained by database 122 may be distributed across multiple server devices (referred to as partitioning). Partitioning can be performed in a variety of manners, and in one implementation is performed by using one or more fields in a given row of a table and applying an algorithm, such as a hash function, to the data in that field(s) in order to generate a partition number for a particular record. Different fields can be used, such as the game title identifier, game session ID, game session key, combinations thereof, and so forth. The partition number identifies the one of the multiple server devices on which the record is stored (or to be stored).

Figure 3:
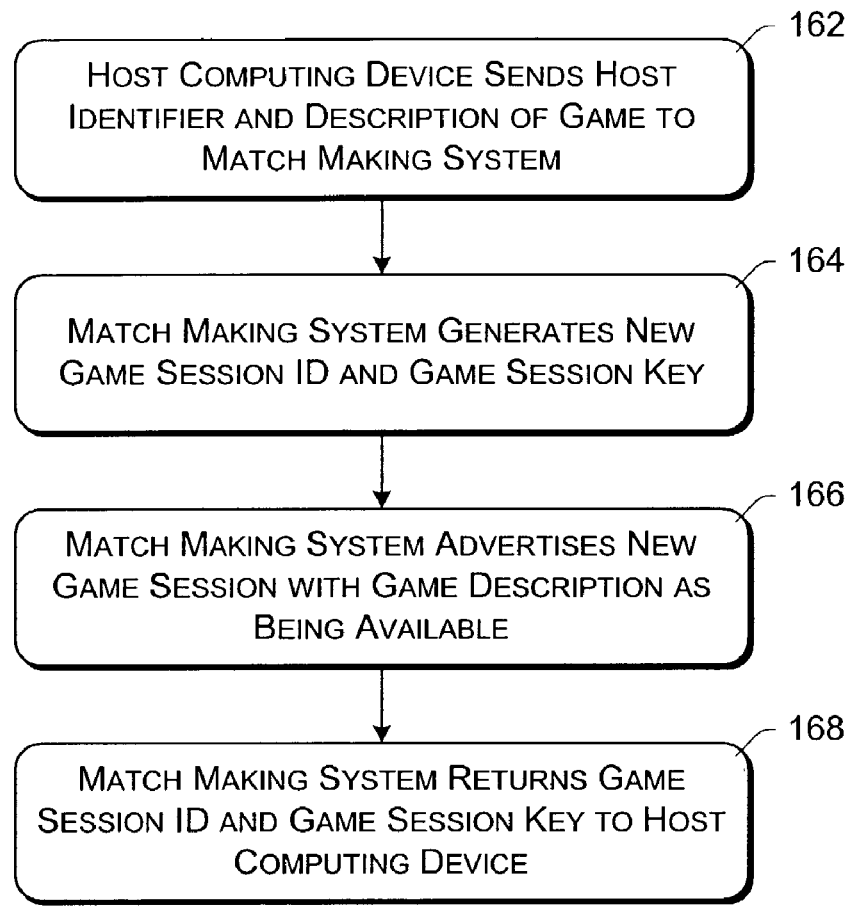
FIG. 3 is a flowchart illustrating an exemplary process for creating a new game session.

FIG. 3 is a flowchart illustrating an exemplary process 160 for creating a new game session. In process 160, both of the game session ID and the game session key are generated by match making system 104. Process 160 may be performed in software, firmware, hardware, or combinations thereof. Process 160 is discussed with additional reference to components of FIGS. 1 and 2.

Initially, the host computing device sends an identifier of itself as well as a description of the game for which the new session is to be created to match making system 104 (act 162). The host identifier includes, for example, a network address structure for the host computing device that can be communicated to other computing devices that join the game session in order to allow those computing devices to communicate with the host device. In one implementation this host identifier is a fully qualified address (XNADDR), which is discussed in more detail below.

The description of the game includes the title of the game as well as one or more attributes of the game. An attribute is a piece of data associated with a game session, or a player in a game session. The attributes of the game can vary by game based on the desires of the game title designer. For example, the attributes may indicate the skill level of the player that initiates creating the new session, the desired skill level of other players that may join the new session, the game location where the play will occur (for example, during the day, at night, at a particular stadium, in a particular city, on a particular track, weather conditions, etc.), objects to be used during play (for example, types of cars, types of airplanes or spaceships, etc.), characteristics of the various characters in the game (for example, special powers that are available, magical spells that are available, etc.), and so forth. Additionally, rather than including the game title, the game title may be inherent in the request (for example, a different request type may be used for each game title).

The host computing device 102 can identify its desire to create a new game session in a variety of different manners. In one implementation, a predefined session ID value is sent in act 162 to indicate to match making system 104 that a new game session is to be created (for example, a session ID value of zero). Alternatively, a special command may be defined for use by host computing device 102 to request creation of a new game session. In yet another alternative, the request may be inherent in some other command, or due to the result of another operation. For example, if a computing device requests to join a game session with a set of attributes for which no current game session satisfies, then match making system 104 may automatically create a new game session with that set of attributes.

Match making system 104 then generates a new game session ID and game session key (act 164). The new game session ID can be generated in a variety of different manners. In one implementation, match making interface 120 generates a random number or pseudo random number to use as the game session ID (e.g., using the cryptographically strong random number generator in the Win32® application programming interface). In the event that the random number is the same as another game session ID currently being used by match making system 104, then match making interface 120 generates a new random number to use as the game session ID (this generation of new random numbers continues until a random number is generated that is not the same as another game session ID currently being used by match making system 104).

The new game session key generated in act 164 can also be generated in a variety of different manners. In one exemplary implementation, match making interface 120 generates a random number or pseudo random number to use as the game session key (e.g., using the cryptographically strong random number generator in the Win32® application programming interface). Alternatively, any of a variety of conventional cryptographic processes can be used to generate the game session key.

Match making system 104 then advertises the new game session, along with the game description, as being available (act 166). In one implementation, this advertising comprises adding a record of the game session to its database and thus making the game session available for searching by other computing devices. Alternatively, this advertising may comprise pushing the game session to one or more computing devices. For example, a computing device may register search criteria (e.g., game sessions with a particular player, particular skill level, or other attributes) with match making interface 120, requesting interface 120 to send a notification of any new game session that satisfies the search criteria to the computing device.

Match making system 104 returns the game session ID and the game session key to the host computing device (act 168). By returning the game session ID and the session key to the host computing device, the host computing device can identify the newly created game session, such as when receiving subsequent communications regarding the game session from other members of the session. Alternatively, in situations where the computing device is permitted to host only a single game session at a time, the game session ID need not be returned to the host computing device and the host device can simply assume that any subsequent communications received regarding a hosted game session are for this newly created game session.

Figure 4:
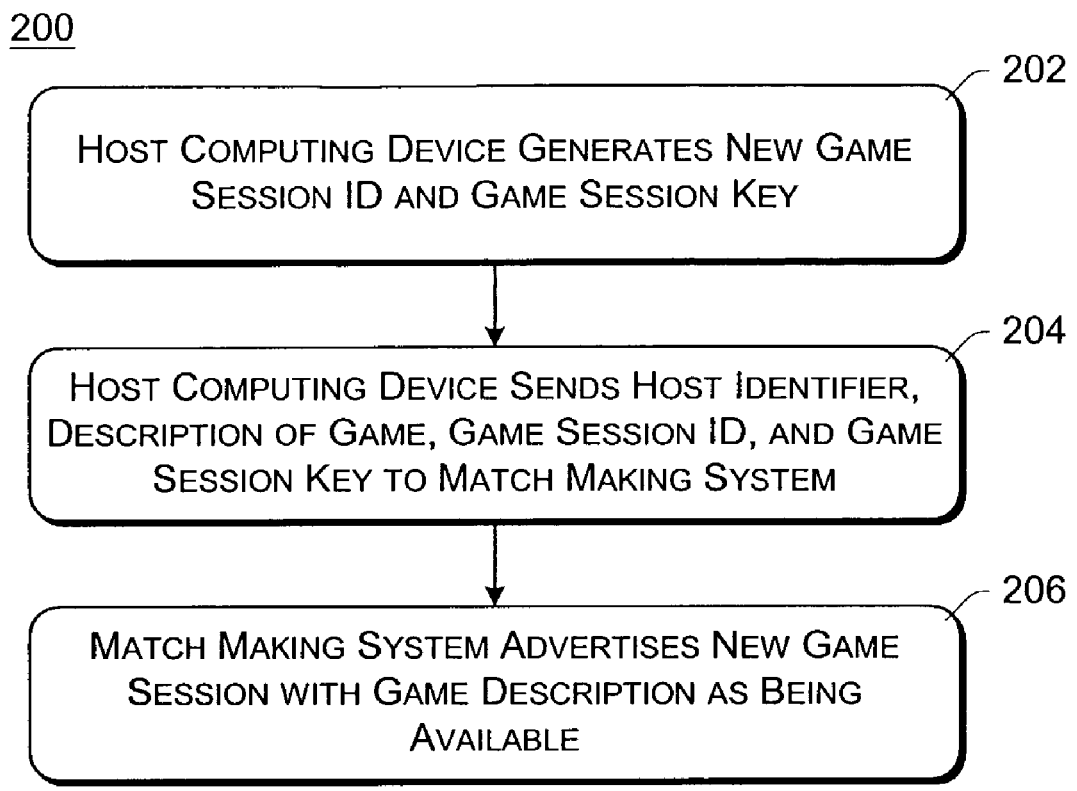
FIG. 4 is a flowchart illustrating another exemplary process for creating a new game session.

FIG. 4 is a flowchart illustrating another exemplary process 200 for creating a new game session. In process 200, both of the game session ID and the game session key are generated by the host computing device 102. Process 200 may be performed in software, firmware, hardware, or combinations thereof. Process 200 is discussed with additional reference to components of FIGS. 1 and 2.

Initially, the host computing device 102 generates a new game session ID and a new game session key for a new game session (act 202). The desire to create a new game session can be identified by the host computing device 102 in a variety of manners analogous to act 162 discussed above with reference to FIG. 3. The new game session ID and new game session key can be generated in a variety of manners, analogous to act 164 discussed above with reference to FIG. 3. The host computing device 102 then sends an identifier of the host computing device 102, a description of the game for the new game session, as well as the game session ID and game session key generated in act 202, to match making system 104 (act 204). Match making system 104 receives this information from the host computing device 102 and advertises the new game session with the game description as being available (act 206). This advertising can be performed in a variety of manners, analogous to act 166 discussed above with reference to FIG. 3.

Figure 5:
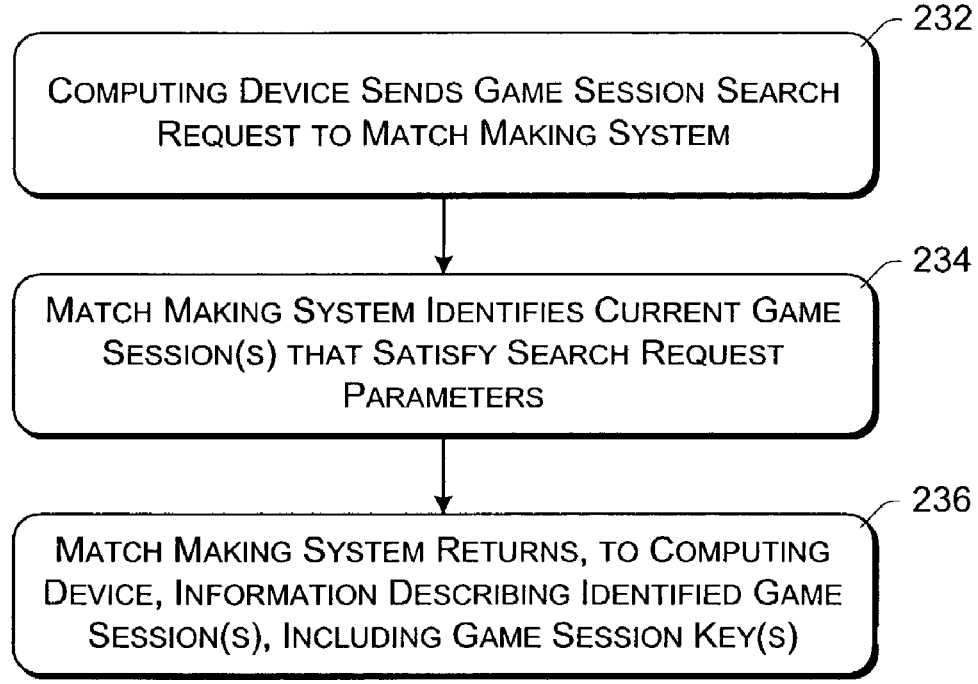
FIG. 5 is a flowchart illustrating an exemplary process for distributing information allowing a computing device to join a game session.

FIG. 5 is a flowchart illustrating an exemplary process 230 for distributing information allowing a computing device to join a game session. Process 230 may be performed in software, firmware, hardware, or combinations thereof. Process 160 is discussed with additional reference to components of FIGS. 1 and 2.

A computing device desiring to join a game session sends a game session search request to match making system 104 (act 232). In one implementation, this game session search request includes the desired game title as well as one or more additional search parameters. Alternatively, the desired game title need not be included (for example, in a situation where a player indicates that he or she simply wants to play any game). In another alternative, the one or more additional search parameters need not be included (for example, in a situation where a player indicates that he or she wants to play a particular game title without concern for any attributes of the game).

Match making system 104 receives the game session search request and identifies zero or more current game sessions that satisfy the search request parameters (act 234) and that have open slots for players to fill. In one implementation, match making system 104 returns only game sessions having a number of open slots equal to or greater than the number of current players using the computing device. If greater than a threshold number of game sessions satisfy the search request parameters, then a subset of those game sessions are returned. Match making system 104 then returns, to the requesting computing device, information describing the identified game sessions (act 236). This information includes the game session key for each of the identified game sessions, thereby allowing the computing device to communicate securely with the other computing device(s) in the game session. This information also includes the descriptive information provided by the host computing device when creating the game session (e.g., in act 162 of FIG. 3 or act 204 of FIG. 4). Thus, the descriptive information returned can include additional attributes of the game beyond what were indicated in the search request parameters.

It should be noted that multiple acts may also be performed in place of act 236. For example, rather than returning the game session keys for all of the identified game sessions, only the game identifiers and descriptive information may be returned to the computing device. A player at the computing device can select one of the identified game sessions, in response to which the computing device sends a request for the game session key for the selected game session to the match making system 104. The match making system 104 then returns the requested game session key to the computing device.

Returning to FIG. 1, a user of a computing device 102 may be able to invite a particular user of another computing device (e.g., a friend of the user's) to join a game session. Such an invitation may be sent via match making system 104, or alternatively another system (e.g., such as a presence and notification system, discussed below with reference to FIG. 13). An invitation to join a game session includes the game session ID for the session, allowing the invited user to search for and have identified the appropriate game session.

Figure 6:
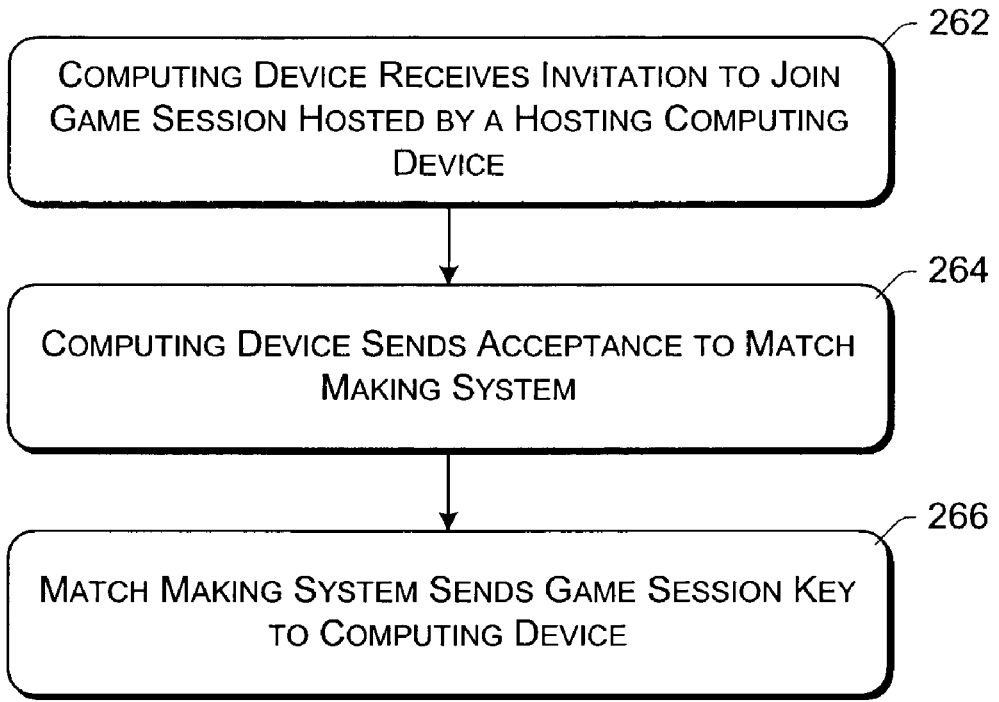
FIG. 6 is a flowchart illustrating an exemplary process for distributing information allowing a computing device to join a game session it has been invited to join.

FIG. 6 is a flowchart illustrating an exemplary process 260 for distributing information allowing a computing device to join a game session it has been invited to join. Process 260 may be performed in software, firmware, hardware, or combinations thereof. Process 260 is discussed with additional reference to components of FIGS. 1 and 2.

Initially, a computing device receives an invitation to join a game session hosted by a hosting computing device (act 262). The computing device sends an acceptance of the invitation to the matchmaking system 104 (act 264). The acceptance in act 264 may be a specific type of request, or alternatively may be a game search request with a single search parameter that is the game session ID of the game session the computing device was invited to join. The matchmaking system 104 responds by sending the game session key for that game session to the computing device (act 266).

In one implementation, a host computing device is able to have a game session created that includes both public and private slots. As part of the creation process, the host computing device identifies to match making system 104 how many public slots are to be included for the game session and how many private slots are to be included for the game session. Each slot can be filled by a single player. Match making system 104 maintains a record of these different slots, and allows a public slot to be filled by searching (e.g., per process 230 of FIG. 5) and allows a private slot to be filled by invitation (e.g., per process 260 of FIG. 6). Thus, when the game session is created, the user can set aside particular slots in the game for his or her friends (whom he or she can subsequently invite), without fear of all the slots being filled by strangers. Match making system 104 may alternatively allow variations on these rules, such as allowing an invited user to fill a public slot if all of the private slots have been filled, allow a non-invited user to fill a private slot if the private slot has been empty for at least a threshold amount of time, and so forth.

In addition to maintaining a record of game sessions, match making system 104 (or alternatively another system operating in cooperation with system 104), can maintain records of other information stored on the individual computing devices 102. For example, certain games titles maintain information about the game play (e.g., various characteristics about the environment of the game, such as the number of fish or obstacles in particular parts of a lake, a number of extra computer-generated characters or animals that are part of a particular scene, weather patterns (e.g., how rough water is in a particular location), and so forth). The computing devices that are playing in this environment typically want to share this information for uniformity of game play amongst the various players, even though the players may not be playing against one another in a head-to-head environment.

Match making system 104 can facilitate the exchange of information for such game titles by maintaining a record of identifiers of the information to be shared as well as indications of where the information is stored (e.g., do all computing devices store the information, or do only selected ones of the computing devices (and if so, which computing devices store the information)). These identifiers can be stored, for example, as attributes of a game session. Thus, rather than performing a search request to obtain information describing game sessions that the user may join, a search request for this game data location(s) may be performed in response to a request from a computing device (which may or may not already be in the game session). The game session key can also be returned to the various computing devices playing the game, in order to allow the devices to exchange the game data directly in a secure manner if necessary. A computing device, having obtained a location(s) for game data from match making system 104, can then access the location(s) (e.g., the computing devices at those locations) to obtain the data from the location. In one implementation, the location is a fully qualified address (XNADDR) of a computing device.

Figure 7:
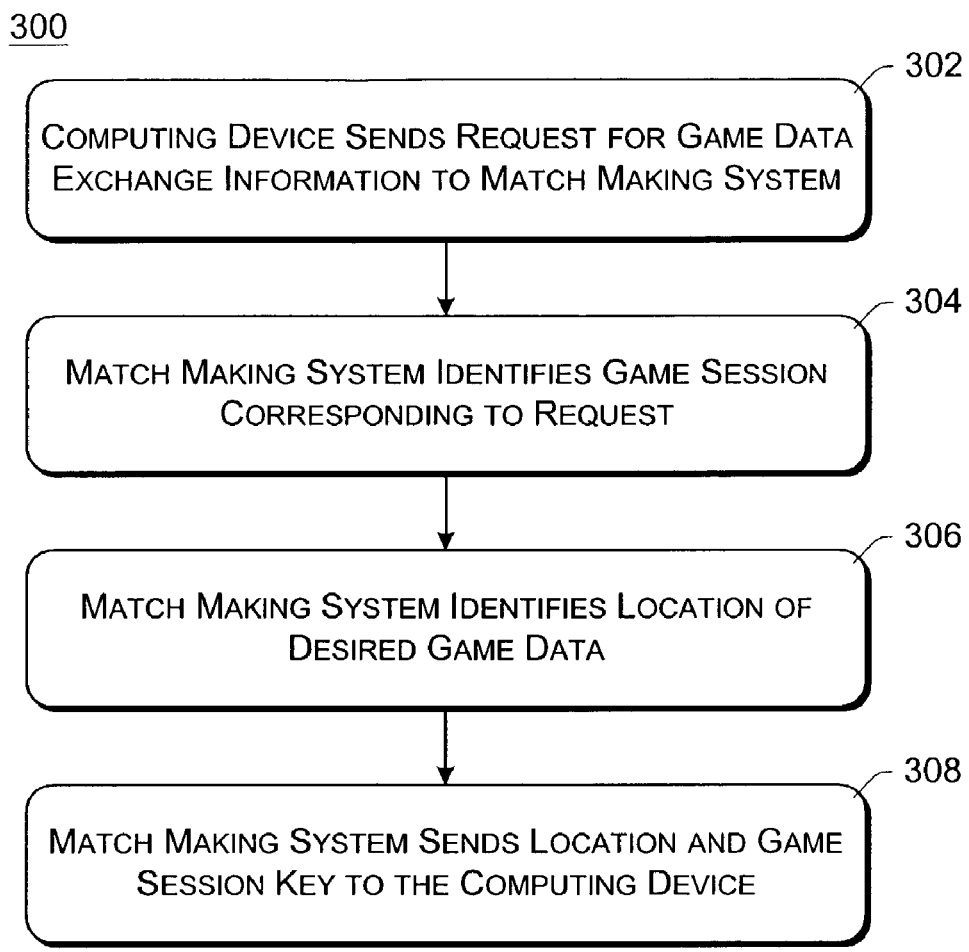
FIG. 7 is a flowchart illustrating an exemplary process for facilitating information exchange among computing devices.

FIG. 7 is a flowchart illustrating an exemplary process 300 for facilitating information exchange among computing devices. Process 300 may be performed in software, firmware, hardware, or combinations thereof. Process 300 is discussed with additional reference to components of FIGS. 1 and 2.

Initially, a computing device sends a request for game data exchange information to match making system 104 (act 302). The request can identify a particular game session by its game session ID, for example. The match making session identifies the game session corresponding to the request (act 304), and identifies the location of the desired game data (act 306). The location of the desired game data can be, for example, a particular one or more of the computing devices in the game session. The match making system then sends the location and game session key to the computing device (act 308), giving the computing device the information it can use to obtain the game data with the appropriate computing device via a secure connection. Alternatively, if the session key has already been communicated to the computing device, then the session key need not be sent in act 308.

Returning to FIG. 2, various attributes can be stored in records 124, and used by match making system 104 in creating and searching game sessions. An attribute is a piece of data associated with a game session or a player in a game session. In one implementation, each attribute has an attribute value that is identified by an attribute ID. An example format of a 32-bit attribute ID is shown in Table I below. The attribute ID uniquely identifies the attribute within a game session, and different bit-ranges of the ID also describe the attribute. The description can specify what entity the attribute relates to, what kind of data is used to represent attribute values and what namespace the attribute is associated with.

In one implementation, an attribute can be associated with a global namespace or a title-specific namespace. Global attributes are those attributes predefined by the match making system, and have a common meaning across games. Title-specific attributes are defined by the game and only have meaning within that game. Thus, it is possible for two different game titles to use the same attribute ID to refer to two different and unrelated attributes. As these title-specific attributes are scoped by the title ID, the attributes are not confused with one another.

TABLE I

| Field | Bits(s) | Description |
| --- | --- | --- |
| Namespace | 31 | Indicates whether the attribute is title-specific (e.g., a value of 0) or global (e.g., a value of 1). |
| Reserved | 28-30 | Reserved for future use. |
| Attribute Type | 24-27 | Indicates the type of attribute (e.g., 0001 for user attribute and 0000 for game session attribute). Other values are reserved for future use. |
| Attribute Data Type | 20-23 | Indicates the type of data stored in the attribute value (e.g., 0000 for integer, 0001 for string, 0010 for binary, 1111 for null). Other values are reserved for future use. |
| Reserved | 16-19 | Reserved for future use. |
| Attribute Specifier | 0-15 | Unique identifier of the attribute within its namespace (title-defined for attributes in the title-specific namespace). |

FIGS. 8-12 illustrate exemplary message formats for communicating requests and responses between a game console 102 of FIG. 1 and match making system 104. Each message format includes multiple fields or portions that can include various data as discussed below.

Figure 8:
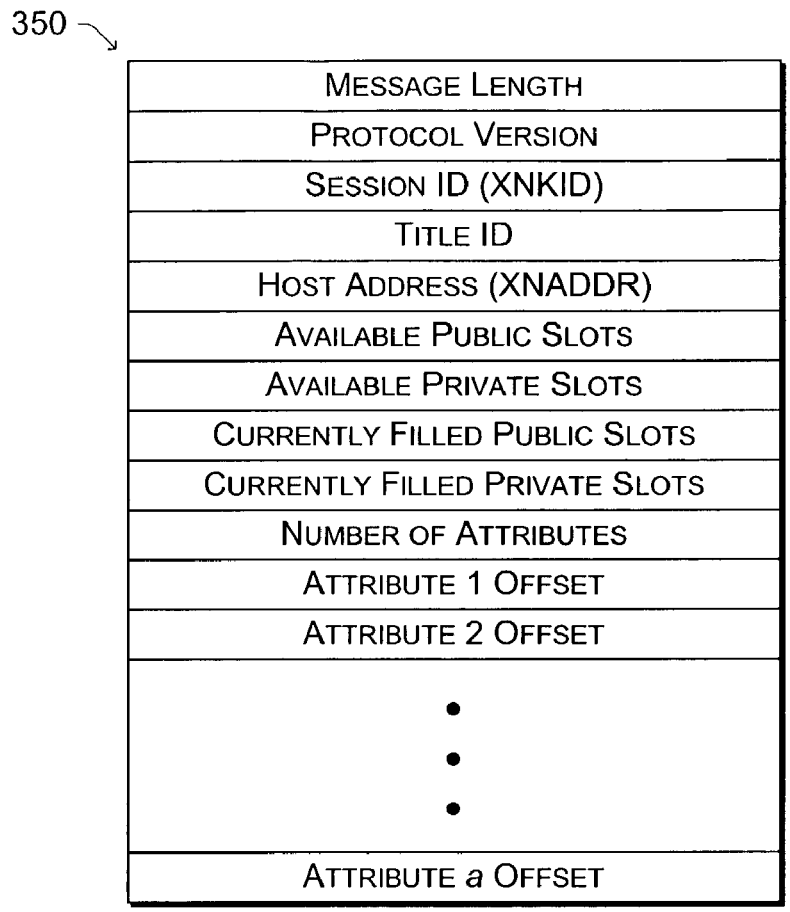
FIG. 8 illustrates an exemplary message structure for communicating a game session creation request.

FIG. 8 illustrates an exemplary message structure 350 for communicating, from game console 102 to match making system 104, a game session creation request. The message link field contains the length of the message structure 350. The protocol version field contains the protocol version of the match making protocol being used. The session ID field contains the game session ID of the corresponding game session. The title ID field contains an identifier of the game title of the corresponding game session.

The host address field contains an address structure of the host computing device. In one implementation, this address structure is referred to as a fully qualified address (XNADDR) for the host computing device. The fully qualified address of the host computing device includes sufficient information to allow other computing devices to access the host computing device even though the host computing device may be situated behind a network address translation (NAT) device, such as a network router.

Figure 13:
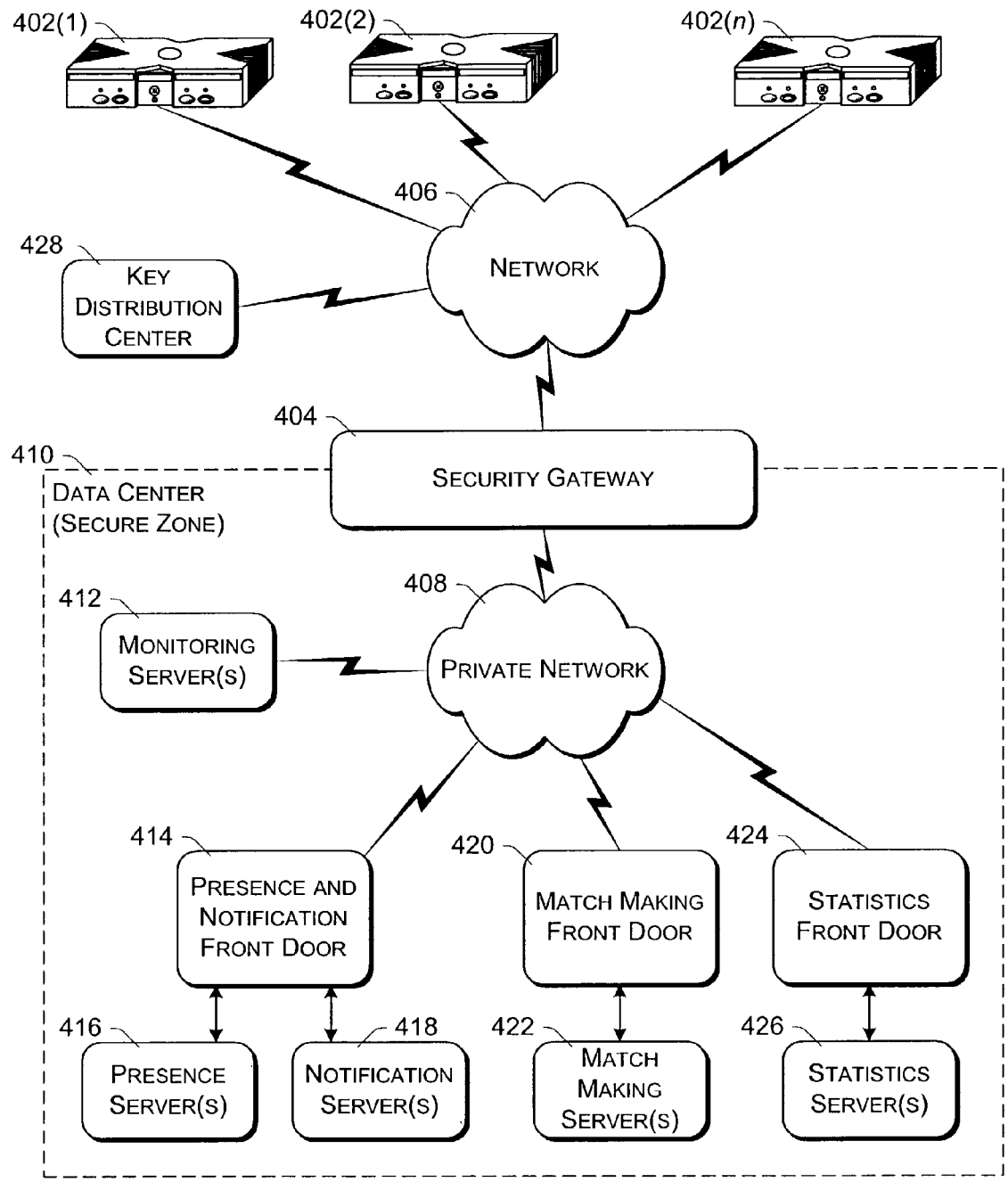
FIG. 13 is a block diagram of an exemplary online gaming environment.

The fully qualified address for a computing device includes: the Ethernet MAC address for the computing device; the local IP address of the computing device (this is the IP address that the computing device believes it has, and may be different than the IP address from which the match making system receives data packets from the computing device (e.g., due to a NAT device, such as a router, situated between the computing device and the match making system (or an intermediary acting on behalf of the match making system, such as security gateway 404 of FIG. 13, discussed below)); the IP address and port from which the match making system (or intermediary) receives data packets from the computing device (this may be the same as the local IP address of the computing device, or alternatively different (e.g., the address of a NAT device)); a logical device number (an identifier assigned to the match making system (or intermediary) to uniquely identify the match making system (or intermediary) within a cluster of multiple match making systems (or intermediaries)); a Security Parameters Index (SPI) value (e.g., $SPI_1$, and/or $SPI_2$); and a computing device id. The contents of the fully qualified address can be determined based on information embedded in data packets received from the computing device as well as information received in establishing a secure connection between the computing device and the match making system (or intermediary).

The value $SPI_1$ refers to a value generated by the computing device that the device includes in the header of each data packet sent via a secure communications channel to the match making system (or intermediary). The first data packet sent by the game console to the match making system (or intermediary) to establish a secure communications channel includes an $SPI_1$ value of zero to indicate to match making system (or intermediary) that a new communications channel is to be established. Subsequent data packets include a non-zero value generated by the game console. Similarly, the match making system (or intermediary) generates a value $SPI_2$ that it includes in the header of each data packet sent via the secure communications channel to the game console. The $SPI_1$ value allows the game console to identify the secure communications channel between the game console and the match making system (or intermediary) as the particular channel to which the data packets sent by the game console correspond, and the $SPI_2$ value similarly allows the match making system (or intermediary) to identify the secure communications channel between the game console and the match making system (or intermediary) as the particular channel to which the data packets sent by the match making system (or intermediary) correspond. Each secure communications channel, even though between the same game console and match making system (or intermediary), typically has different SPI values.

The available public slots field specifies the number of searchable player slots available in this game. As players join or leave the game, the value in the available public slots field is updated accordingly. The available private slots field specifies the number of private player slots available in this game. As players join or leave the game, the value in the available private slots field is updated accordingly. A private player slot can be taken only by a player that has received an invitation to the game session.

The currently filled public slots field specifies the number of public slots that are currently filled by players. As players join or leave the game, the value in this currently filled public slots field is updated accordingly. The currently filled private slots field specifies the number of private slots that are currently filled by players. As players join or leave the game, the value in this currently filled private slots field is updated accordingly. The number of attributes field specifies the number of attributes associated with this game session. The attributes offset fields specify the offsets to the attributes associated with this game session. The attributes can be arranged in any order. Each attribute offset identifies (e.g., is a pointer to) a region of the message that includes the attribute ID and attribute value.

Figure 9:
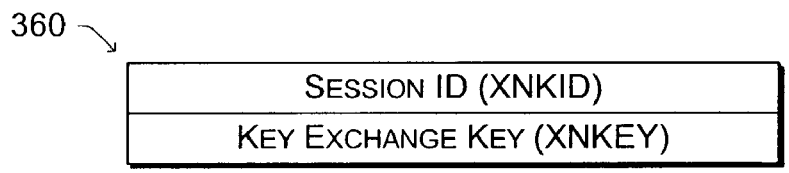
FIG. 9 illustrates an exemplary message structure for communicating a response to a game session creation request.

FIG. 9 illustrates an exemplary message structure 360 for communicating, from match making system 104 to game console 102, a response to a game session creation request. The session ID field contains the game session ID assigned to this game session. The key exchange key field contains the game session key assigned to this game session.

Figure 10:
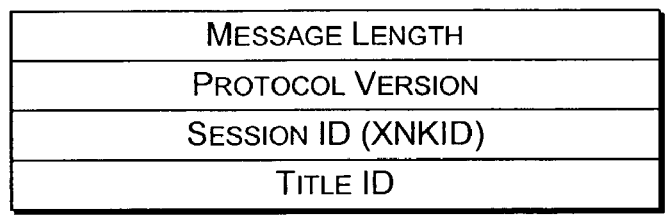
FIG. 10 illustrates an exemplary message structure for communicating a request to delete a game session

FIG. 10 illustrates an exemplary message structure 370 for communicating, from game console 102 to match making system 104, a request to delete a game session. The message link field contains the length of the message structure 370. The protocol version field contains the protocol version of the match making protocol being used. The session ID field contains the game session ID of the corresponding game session. The title ID field contains an identifier of the game title of the corresponding game session.

Figure 11:
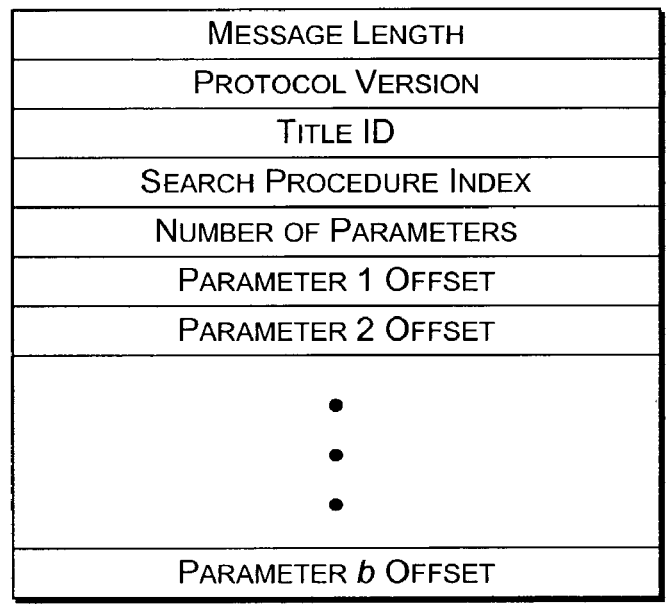
FIG. 11 illustrates an exemplary message structure for communicating a game session search request.

FIG. 11 illustrates an exemplary message structure 380 for communicating, from game console 102 to match making system 104, a game session search request. The message link field contains the length of the message structure 380. The protocol version field contains the protocol version of the match making protocol being used. The title ID field contains an identifier of the game title of the corresponding game session. The search procedure index field specifies which stored procedure in the match making system is to be used to perform the search. Different search procedure indexes can be used to specify different types of searches to be performed, such as searching based on the game session ID (e.g., when responding to invitations to join games) or searches based on other parameters.

The number of parameters field specifies the number of parameters that are being sent with this game session search request. The parameters can be arranged in any order. Each parameter includes a data type indicator followed by the parameter data.

FIG. 12 illustrates an exemplary message structure 390 for communicating, from match making system 104 to game console 102, a response to a game session search request. The result link field contains the total length of the search result message structure 390, including any attributes. The session ID field contains the game session ID of the corresponding game session. The host address field contains an address structure of the host computing device. In one implementation, this address structure is referred to as a fully qualified address (XNADDR) for the host computing device.

The available public slots field specifies the number of searchable player slots available in this game. The available private slots field specifies the number of private player slots available in this game. The currently filled public slots field specifies the number of public slots that are currently filled by players. The currently filled private slots field specifies the number of private slots that are currently filled by players. The number of additional attributes field specifies the number of attributes associated with this game session. The attributes can be arranged in any order. Each attribute offset identifies (e.g., is a pointer to) a region of the message that includes the attribute ID and attribute value.

In one implementation, match making database 122 of FIG. 2 uses multiple tables to store the data for various game sessions. These tables and the data stored in each is discussed below in Tables II-X below. These tables include: a match sessions table (Table II) that includes a master list of all game sessions being managed by match making system 104; a match attributes table (Table III) that includes a list of session attributes for all current game sessions being managed by match making system 104; a match attribute information table (Table IV) that includes a list of valid, title-specific attributes used to monitor the number of title-specific attributes a given title is using (an attribute limit may optionally be imposed on titles, or fees charged based on number of attributes); a match titles table (Table V) that includes information about each game title certified to use match making system 104; a match session security gateway lookup table (Table VI) that includes information that allows a reverse lookup from the security gateway address to the associated game session ID (security gateways are discussed in more detail below with reference to FIG. 13); a match configuration table (Table VII) includes configuration information used by the match making database application; a match zones table (Table VIII) includes a complete list of network zones (e.g., a set of network zones established within a network in which match making system 104 of FIG. 1 is implemented, such as data center 410 of FIG. 13); a match zone map (Table IX) includes definitions of which network address prefixes reside in which zones; and a match zone distances table (Table X) includes distances (e.g., network latencies) between pairs of zones.

TABLE II

| Field | Description |
| --- | --- |
| i_session_id | Contains the game session ID that uniquely identifies the game session within the scope of the title ID. |
| i_title_id | Identifies the game title being played in this session. |
| b_host_address | Contains an XNADDR structure. |
| I_zone_id | Host Address mapped to a proximity zone. |
| b_key_exchange_key | Game session key-shared by all participants in the session. Can be used to secure communications among participants, or establish additional peer-to-peer keys among participants. |
| i_public_available | Number of public slots open for this session. |
| i_private_available | Number of private slots open for this session. |
| i_public_current | Current number of players occupying public slots. |
| i_private_current | Current number of players occupying private slots. |
| dt_session_expiration | Specifies the time when this session will be removed from the database, if it is not proactively removed by the host. |
| f_selection_probability | Contains a selection probability that is adjusted over time as this session is returned in search results. The probability also decays over time. |
| dt_change_probability | Contains the last time that the selection probability was updated. |

TABLE III

| Field | Description |
| --- | --- |
| i_attribute_id | Contains the attribute ID that uniquely identifies this attribute within the session. |
| i_title_id | Identifies the game title that the attribute (and the session) is associated with. |
| sv_value | Contains the attribute value. |
| bi_session_id | Contains the session ID that uniquely identifies the session that this attribute is associated with. |
| bi_user_puid | User ID (e.g., a Passport User ID (PUID) assigned by Microsoft ® Passport) of the player that this attribute is associated with. If this is a session attribute, then this column will contain zero. |
| i_user_flags | Guest account information related to bi_user_puid. |

TABLE IV

| Field | Description |
| --- | --- |
| i_title_id | Identifies the game title that defines this attribute. |
| i_attribute_id | Contains the attribute ID that uniquely identifies the attribute for the title. |

TABLE V

| Field | Description |
| --- | --- |
| i_title_id | Unique identifier for the title. |
| i_publisher_id | Unique identifier of the publisher of this title. |
| i_maximum_attributes | Maximum number of attributes that this title is allowed to define and store. |
| i_session_expiration | Specifies the expiration time for all sessions created for this title. |
| vc_db_list | Semi-colon separated list of db names. |

TABLE VI

| Field | Description |
| --- | --- |
| i_sg_ip | IP Address of the security gateway. |
| b_id | Remainder of SGADDR minus the SG IP address. |
| i_title_id | Title ID of the associated session. |
| bi_session id | Session ID of the association session. |
| vc_db_list | Semi-colon separated list of db names. |

TABLE VII

| Field | Description |
| --- | --- |
| vc_name | Name of the configuration item. |
| vc_value | Value of the configuration item. |

TABLE VIII

| Field | Description |
| --- | --- |
| i_zoneID | Unique identifier for the zone. |

TABLE IX

| Field | Description |
| --- | --- |
| i_prefix | Network address prefix. |
| ti_prefix_length | Number of bits in i_prefix that are significant. |
| i_zoneID | Zone that this prefix resides in. |

TABLE X

| Field | Description |
| --- | --- |
| i_zoneID1 | Source zone ID. |
| i_zoneID2 | Destination zone ID. |
| i_distance | The distance (network latency) between the two zones. |

In one implementation, a set of application programming interfaces (APIs) are made available to the game titles to employ the match making functionality. These APIs are exposed to the game titles on the computing devices and allow game sessions to be created and searched. A set of game session host APIs to support hosting of game sessions includes:

XOnlineMatchSessionCreate
    XOnlineMatchSessionUpdate
    XOnlineMatchSessionDelete
    XOnlineMatchGetSessionInfo A set of game session client APIs to support searching game sessions includes:

XOnlineMatchSearch
    XOnlineMatchSessionFindFromID
    XOnlineMatchSearchGetResults
    XOnlineMatchSearchParse The game title on a computing device host of a game session first calls XOnlineMatchSessionCreate to create a new game session. The base session information and a structure containing any desired attributes are passed in. The API will format and send the game session request to the match making system. An online task handle is returned. After the session create task has completed, the caller can then use the task handle to retrieve the game session ID and game session key (key exchange key) using the XOnlineMatchGetSessionInfo API. If the session information or attributes change, XOnlineMatchSessionUpdate can be called to send the updates to the server. Again, a task handle is returned. XOnlineMatchSessionDelete is called when the host no longer wishes to advertise the game session on the server.

XOnlineMatchSessionCreate

This function initializes a hosted game session and returns an asynchronous task handle.

HRESULT XonlineMatchSessionCreate(
        IN DWORD dwPublicCurrent,
        IN DWORD dwPublicAvailable,
        IN DWORD dwPrivateCurrent,
        IN DWORD dwPrivateAvailable,
        IN DWORD dwNumAttributes,
        IN PXONLINE_ATTRIBUTE pAttributes,
        IN HANDLE hWorkEvent,
        OUT PXONLINETASK_HANDLE phTask
    );

XOnlineMatchSessionCreate Parameters dwPublicCurrent—The number of players in the session currently occupying public slots.

dwPublicAvailable—The number of available public slots.

dwPrivateCurrent—The number of players in the session currently occupying private slots.

dwPrivateAvailable—The number of available private slots.

dwNumAttributes—The number of attributes that will be advertised for this session. This number should take into account user-specific attributes that may be duplicated in the case that multiple users are sitting at the console.

pAttributes—An array of attribute structures describing the attributes of the session.

hWorkEvent—This is the handle to a caller-created event object. The caller can periodically check this event to determine if there is work to do. The caller can also pass in NULL if they plan on using a polling model.

phTask—On input this parameter should point to a valid task handle variable. On successful return, this variable will be filled in with a valid handle.

XOnlineMatchSessionCreate Return Value

S_OK—Game session was successfully created, handle is returned in phTask.

XOnlineMatchSessionUpdate

This function is used to change session information and attributes on the server after a session has already been created.

HRESULT XOnlineMatchSessionUpdate(
        IN XNKID SessionID,
        IN DWORD dwPublicCurrent,
        IN DWORD dwPublicAvailable,
        IN DWORD dwPrivateCurrent,
        IN DWORD dwPrivateAvailable,
        IN DWORD dwNumAttributes,
        IN PXONLINE_ATTRIBUTE pAttributes,
        IN HANDLE hWorkEvent,
        OUT PXONLINETASK_HANDLE phTask
    );

XOnlineMatchSessionUpdate Parameters

SessionID—Identifies the session that is being updated. This value can be retrieved from XOnlineMatchSessionGetInfo.

dwPublicAvailable—The number of available public slots.

dwPrivateCurrent—The number of players in the session currently occupying private slots.

dwPrivateAvailable—The number of available private slots.

dwNumAttributes—The number of attributes that will be advertised for this session. This number should take into account user-specific attributes that may be duplicated in the case that multiple users are sitting at the console.

pAttributes—An array of attribute structures describing the attributes of the session.

hWorkEvent—This is the handle to a caller-created event object. The caller can periodically check this event to determine if there is work to do. The caller can also pass in NULL if they plan on using a polling model.

phTask—On input this parameter should point to a valid task handle variable. On successful return, this variable will be filled in with a valid handle.

XOnlineMatchSessionUpdate Return Value

S_OK—The function was successful.

XOnlineMatchSessionDelete

This function is used to remove a session and all of its attributes from the server.

HRESULT XOnlineMatchSessionDelete(
IN XNKID SessionID,
IN HANDLE hWorkEvent,
OUT PXONLINETASK HANDLE_phTask
);

XOnlineMatchSessionDelete Parameters

SessionID—Identifies the session being deleted. This value is retrieved from XOnlineMatchSessionGetInfo after a session is created.

hWorkEvent—This is the handle to a caller-created event object. The caller can periodically check this event to determine if there is work to do. The caller can also pass in NULL if they plan on using a polling model.

phTask—On input this parameter should point to a valid task handle variable. On successful return, this variable will be filled in with a valid handle.

XOnlineMatchSessionDelete Return Value

S_OK—The function was successful.

XOnlineMatchGetSessionInfo

This function is used to retrieve the session information from a task handle after XOnlineMatchSessionCreate has successfully completed.

HRESULT XonlineMatchGetSessionInfo(
IN XONLINETASK_HANDLE hTask,
OUT XNKID *pSessionID,
OUT XNKEY *pKeyExchangeKey
);

XOnlineMatchGetSessionInfo Parameters hTask—Online task handle returned by XOnlineMatchSessionCreate.

pSessionID—Address of an XNKID variable that will receive the session ID.

pKeyExchangeKey—Address of an XNKEY variable that will receive the key exchange key.

XOnlineMatchGetSessionInfo Return Value

S_OK—The session ID and key were successfully returned.

To perform a game search, a game title calls XOnlineMatchSearch. The game title passes in the procedure index, the maximum number of search results it wishes to receive and any parameters to be passed to the search stored procedure on the database. The game also specifies the maximum buffer size that the search results can occupy. This buffer size is allocated internally by the API, and any search results that do not fit in this buffer will be dropped. The game title can optionally specify an event handle that will be signaled when there is any work to do.

XOnlineMatchSearch returns an online task handle. When the search task has indicated completion, the game can retrieve an array of search results by calling XOnlineMatchSearchGetResults with the task handle. The search results can be accessed individually at this point. Any extended attributes returned can be parsed using XOnlineMatchSearchParse. The game knows beforehand the order and types of the attributes returned. Each individual search result contains the XNADDR, XNKID and XNKEY used to connect to the game session host.

In the case where a specific game session ID is already known via some out-of-band mechanism such, the XOnlineMatchSessionFindFromID API can be used to retrieve a single session using the session ID. Once this task has completed, the caller uses XOnlineMatchSearchGetResults to retrieve the XNADDR, XNKID and XNKEY of the requested session.

XOnlineMatchSearch

This function creates a new game session search, sends it to the server and returns an asynchronous task handle for monitoring the progress of the request. This function allocates a buffer for the search results internally, using the size passed in by the caller.

HRESULT XOnlineMatchSearch(
IN DWORD dwProcedureIndex,
IN DWORD dwNumResults,
IN DWORD dwNumAttributes,
IN PXONLINE_ATTRIBUTE pAttributes,
IN DWORD dwResultsLen,
IN HANDLE hWorkEvent,
OUT PXONLINETASK_HANDLE phTask
);

XOnlineMatchSearch Parameters dwProcedureIndex—Identifies the stored procedure for this title that will be run on the database to execute the search.

dwNumResults—Specifies that maximum number of search results that the game is interested in processing.

dwNumAttributes—The number of parameters that will be passed as part of this request, and ultimately passed to the stored procedure.

pAttributes—An array of parameter values.

dwResultsLen—This parameter specifies the amount of buffer space that this API will allocate to hold search results. These APIs will attempt to fill up the buffer space specified by this parameter.

hWorkEvent—This is a handle to a caller-created event object. This object becomes signaled when there is work to do. This parameter is optional and the caller may pass in NULL instead, indicating that the caller will poll.

phTask—Upon successful return, this parameter will point to a handle that uniquely identifies this search. This handle is used in subsequent API calls.

XOnlineMatchSearch Return Value

S_OK—Search was created successfully.

XOnlineMatchSessionFindFromID

This function retrieves information for a single, specified session. This function assumes that the session ID is retrieved via some out-of-band mechanism, such as invitations. This function is essentially a short-hand form of XOnlineMatchSearch, where the procedure index, parameters and maximum results are fixed. All of the events that occur under the covers for XOnlineMatchSearch, will also occur for this API.

The returned task handle is used to allow the API to periodically perform its work. It is identical to the handle returned by XOnlineMatchSearch.

```
HRESULT XOnlineMatchSessionFindFromID(
    IN XNKID SessionID,
    IN HANDLE hWorkEvent,
    OUT PXONLINETASK_HANDLE phTask
);
```

XOnlineMatchSessionFindFromID Parameters

SessionID—The XNKID of the session to get.

hWorkEvent—This is a handle to a caller-created event object. This object becomes signaled when there is work to do. This parameter is optional and the caller may pass in NULL instead, indicating that the caller will poll.

phTask—Upon successful return, this parameter will point to a handle that uniquely identifies this search. This handle is used in subsequent search API calls.

XOnlineMatchSessionFindFromID Return Value

S-OK—Search request was sent successfully.

XOnlineMatchSearchGetResults

This function is used to retrieve a set of search results for a specified search request. This function is called after the task handle obtained from a previous call to XOnlineMatchSearch indicates successful completion.

```
HRESULT XOnlineMatchSearchGetResults(
    IN XONLINETASK_HANDLE hTask,
    OUT  PXMATCH_SEARCHRESULT**prgpSearch
        Results,
    OUT DWORD *pdwReturnedResults
);
```

XOnlineMatchSearchGetResults Parameters hTask—An online task handle returned from a previous call to XOnlineMatchSearch.

prgpSearchResults—Receives a pointer to an array of search result structures.

pdwReturnedResults—Receives the number of search result structures pointed to by prgpSearchResults.

XOnlineMatchSearchGetResults Return Value

S_OK—Search results were successfully returned.

XOnlineMatchSearchParse

This function is used to retrieve extended attributes from a particular search result. The caller must know the exact order and type of the extended attributes.

```
HRESULT XOnlineMatchSearchParse(
    IN PXMATCH_SEARCHRESULT pSearchResult,
    IN DWORD dwNumSessionAttributes,
    IN  PXONLINE_ATTRIBUTE_SPECpSessionAttri-
        buteSpec,
    OUT PVOID pQuerySession
);
```

XOnlineMatchSearchParse Parameters pSearchResult—Specifies the search result being parsed.

dwNumSessionAttributes—Specifies the number of extended attributes in the search result.

pSessionAttributeSpec—Identifies the types of each of the attributes.

pQuerySession—Buffer to contain the attributes.

FIG. 13 is a block diagram of an exemplary online gaming environment 400. Multiple game consoles 402(1), 402(2), . . . , 402(n) are coupled to a security gateway 404 via a network 406. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408—refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, and one or more notification servers 418 (collectively implementing a presence and notification service); one or more match making front doors 420 (e.g., interfaces 120 of FIG. 2) and one or more match making servers 422 (e.g., databases 122 of FIG. 2) (collectively implementing a match making system); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 13, alternatively multiple data centers may exist with which game consoles 402 can communicate. These data centers may operate independently or alternatively may operate collectively (e.g., to make one large data center available to game consoles 402).

Game consoles 402 are situated remotely from data center 410, and access data center 410 via network 406. A game console 402 desiring to communicate with one or more devices in the data center establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type.

The secure communication channel between a console 402 and security gateway 404 is based on a security ticket. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway cluster 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet can still be authenticated.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 of the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match making server(s) 422 hold and process data concerning the matching of online players to one another, as discussed above. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 424 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

Figure 14:
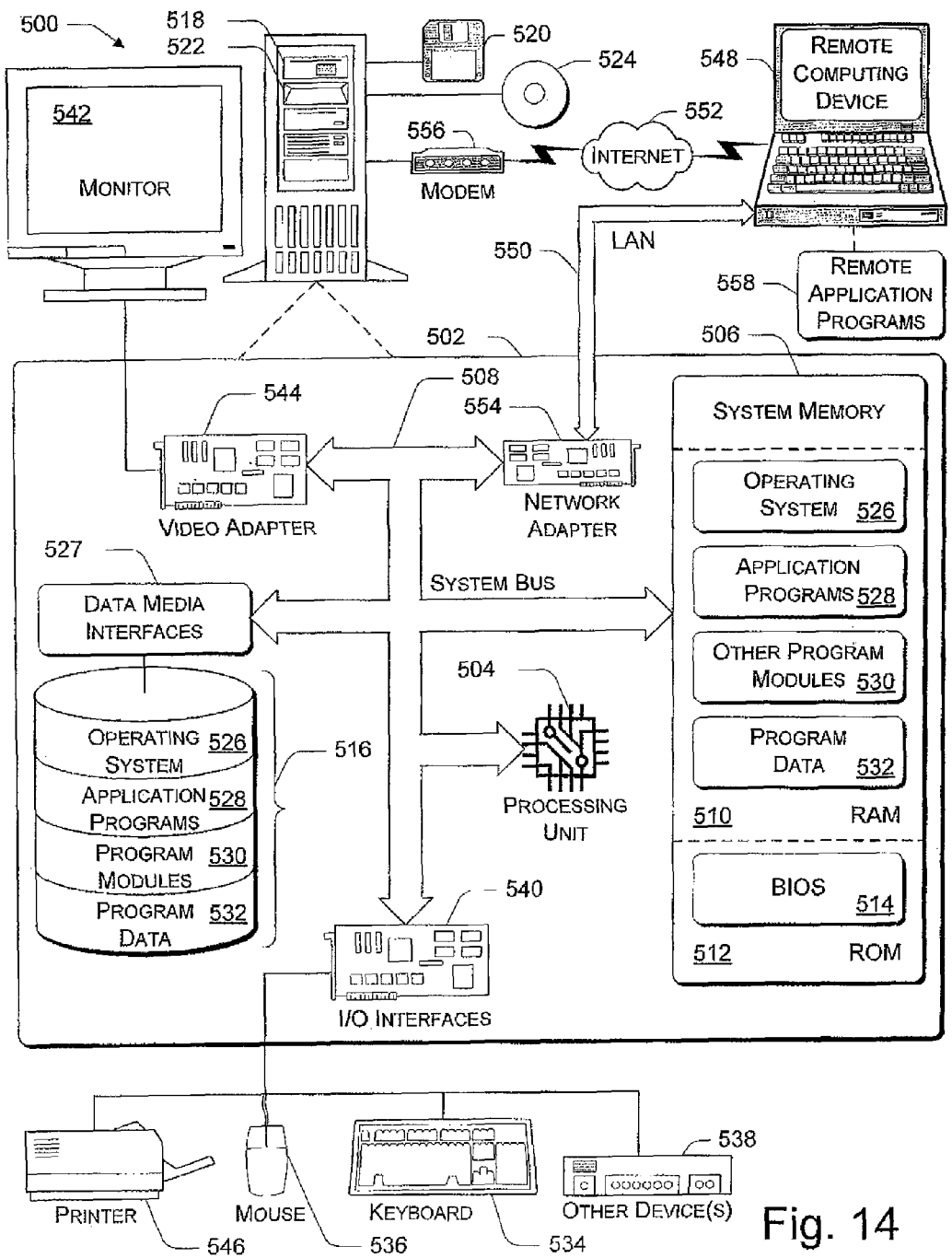
FIG. 14 illustrates a general computer environment, which can be used to implement the techniques described herein

FIG. 14 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be, for example, a match making system 104 or computing device 102 of FIG. 1, a match making interface 120 or match making database 122 of FIG. 2, a server 412, 416, 418, 422, and/or 426 of FIG. 13, or a front door 414, 420, or 424 of FIG. 13. The components of computer 502 can include, but are not limited to, one or more processors or processing units 504 (optionally including a cryptographic processor or co-processor), a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 14 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 527. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Figure 15:
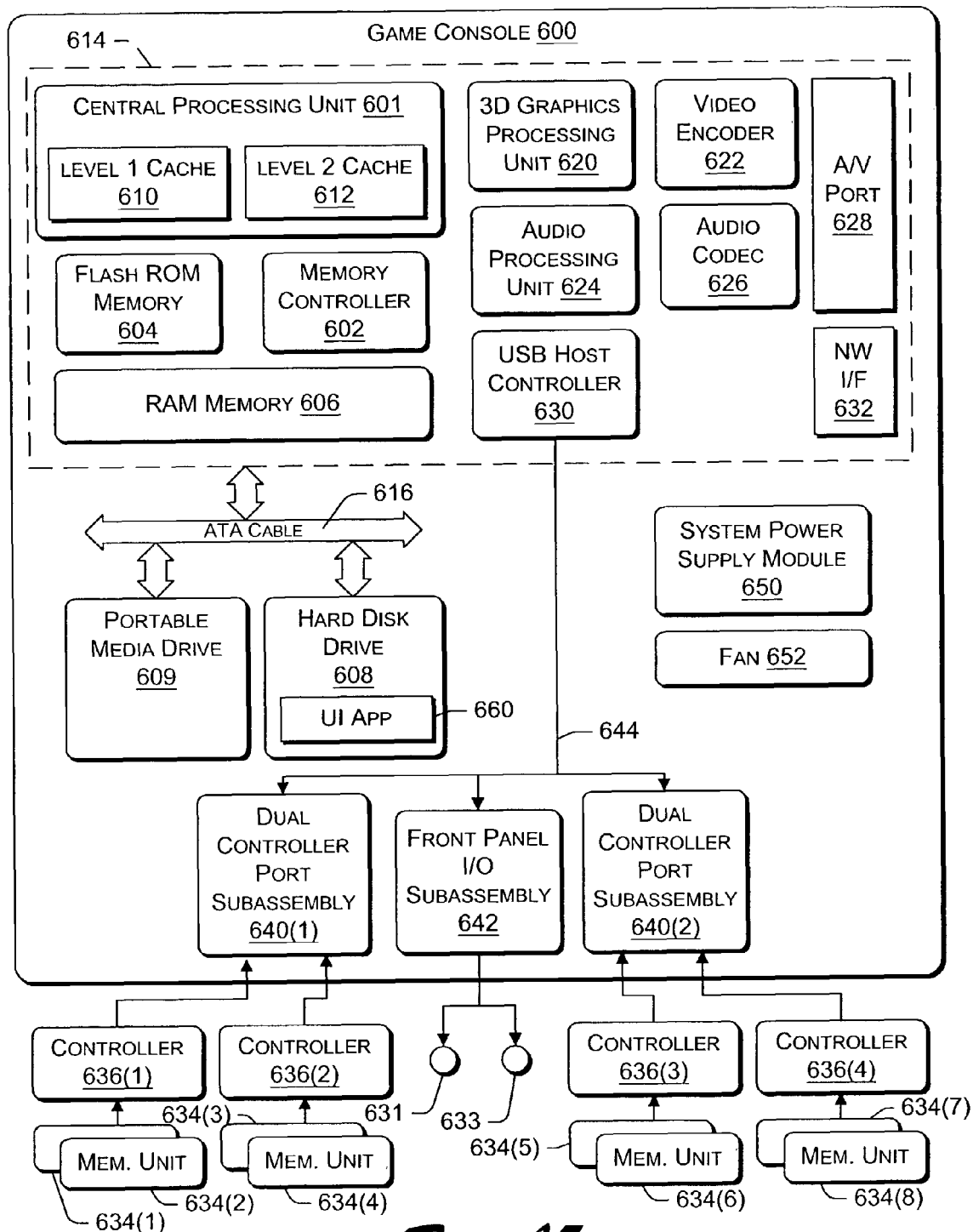
FIG. 15 shows functional components of a game console in more detail

FIG. 15 shows functional components of a game console 600 in more detail. Game console 600 can be used, for example, as a computing device 102 of FIG. 1. Game console 600 has a central processing unit (CPU) 601 and a memory controller 602 that facilitates processor access to various types of memory, including a flash ROM (Read Only Memory) 604, a RAM (Random Access Memory) 606, a hard disk drive 608, and a portable media drive 609. CPU 601 is equipped with a level 1 cache 610 and a level 2 cache 612 to temporarily store data and hence reduce the number of memory access cycles, thereby improving processing speed and throughput.

CPU 601, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 601, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 609 are connected to the memory controller via the PCI bus and an ATA (AT Attachment) bus 616.

A 3D graphics processing unit 620 and a video encoder 622 form a video processing pipeline for high speed and high resolution graphics processing. Data is carried from the graphics processing unit 620 to the video encoder 622 via a digital video bus (not shown). An audio processing unit 624 and an audio codec (coder/decoder) 626 form a corresponding audio processing pipeline with high fidelity and stereo processing. Audio data is carried between the audio processing unit 624 and the audio codec 626 via a communication link (not shown). The video and audio processing pipelines output data to an A/V (audio/video) port 628 for transmission to the television or other display. In the illustrated implementation, the video and audio processing components 620-628 are mounted on the module 614.

Also implemented on the module 614 are a USB host controller 630 and a network interface 632. The USB host controller 630 is coupled to the CPU 601 and the memory controller 602 via a bus (e.g., PCI bus) and serves as host for the peripheral controllers 636(1)-636(4). The network interface 632 provides access to a network (e.g., Internet, home network, etc.) and may be any of a wide variety of various wire or wireless interface components including an Ethernet card, a modem, a Bluetooth module, a cable modem, and the like.

The game console 600 has two dual controller support subassemblies 640(1) and 640(2), with each subassembly supporting two game controllers 636(1)-636(4). A front panel I/O subassembly 642 supports the functionality of a power button 631 and a media drive eject button 633, as well as any LEDs (light emitting diodes) or other indicators exposed on the outer surface of the game console. The subassemblies 640(1), 640(2), and 642 are coupled to the module 614 via one or more cable assemblies 644.

Eight memory units 634(1)-634(8) are illustrated as being connectable to the four controllers 636(1)-636(4), i.e., two memory units for each controller. Each memory unit 634 offers additional storage on which games, game parameters, and other data may be stored. When inserted into a controller, the memory unit 634 can be accessed by the memory controller 602.

A system power supply module 650 provides power to the components of the game console 600. A fan 652 cools the circuitry within the game console 600.

A console user interface (UI) application 660 is stored on the hard disk drive 608. When the game console is powered on, various portions of the console application 660 are loaded into RAM 606 and/or caches 610, 612 and executed on the CPU 601. Console application 660 presents a graphical user interface that provides a consistent user experience when navigating to different media types available on the game console.

Game console 600 implements a cryptography engine to perform common cryptographic functions, such as encryption, decryption, authentication, digital signing, hashing, and the like. The cryptography engine may be implemented as part of the CPU 601, or in software stored on the hard disk drive 608 that executes on the CPU, so that the CPU is configured to perform the cryptographic functions. Alternatively, a cryptographic processor or co-processor designed to perform the cryptographic functions may be included in game console 600.

Game console 600 may be operated as a standalone system by simply connecting the system to a television or other display. In this standalone mode, game console 600 allows one or more players to play games, watch movies, or listen to music. However, with the integration of broadband connectivity made available through the network interface 632, game console 600 may further be operated as a participant in online gaming, as discussed above.

Various processes are illustrated by way of flowcharts herein. It should be noted that the acts involved in these processes can be performed in the order shown in the flowcharts, or alternatively in different orders. For example, in FIG. 3, the acts may be performed in the order shown, or alternatively in different orders (e.g., 168 may be performed prior to or concurrent with act 166). By way of another example, in FIG. 4, the acts may be performed in the order shown, or alternatively in different orders (e.g., act 206 may be performed prior to or concurrent with act 204).

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of communicating between a server device and a plurality of game consoles comprising a first game console and a second game console on a network, the method being implemented in the server device and comprising:
receiving, at the server device, a request from the first game console for information describing one or more of a plurality of game sessions created by one or more of the plurality of game consoles other than the first game console, each of the one or more of the plurality of game sessions comprising:
  a title identification (ID) field containing an identifier of a game being hosted at a second game console different from the first game console; and
  a host address field containing a fully qualified address comprising an XNADDR of the second game console, wherein:
  each of the one or more of the plurality of game sessions is created at the second game console and is communicated between the second game console and the server device through a set of application programming interfaces (APIs); and
  the set of application programming interfaces (APIs) is made available and exposed to the game hosted at the second game console to facilitate:
    creation of the one or more of the plurality of game sessions at the second game console; and
    search of the one or more of the plurality of game sessions by the plurality of game consoles; and
responding from the server device to the first game console with the information describing the one or more of the plurality of game sessions as well as one or more game session keys associated with the one or more of the plurality of game sessions, wherein:
  each of the one or more game session keys is created at the second game console in order for the first game console to securely communicate to the second game console and to join the game hosted at the second game console; and
  the information facilitates the first game console playing the game hosted at the second game console without the first game console being further routed through the server device.

2. A method as recited in claim 1, wherein the request includes one or more parameters describing the one or more of the plurality of game sessions about which the first game console desires to receive information.

3. A method as recited in claim 2, wherein the one or more parameters comprise a skill level of players in the one or more of the plurality of game sessions.

4. A method as recited in claim 2, wherein the one or more parameters comprise a game session ID.

5. A method as recited in claim 1, wherein responding to the request further comprises returning to the first game console information allowing the first game console to join the one or more of the plurality of game sessions hosted by the one or more other hosting game consoles, and wherein the first game console and the one or more other hosting game consoles are each situated behind different network address translation (NAT) devices.

6. A method as recited in claim 1, further comprising:
receiving a request for game data exchange information from the first game console;
identifying a location of the requested game data; and
sending, to the first game console, an identifier of the location, wherein the identifier comprises the fully qualified address (XNADDR) of the location.

7. One or more computer storage media having stored thereon a plurality of instructions that, when executed by one or more processors, causes the one or more processors to perform a computer-implemented method, the method comprising:
receiving, at a server device from a first game console, a first request describing a new game session, the first request comprising:
a game session identifier for the new game session;
a fully qualified address comprising an XNADDR of the hosting game console; and
a game session key for the new game session, wherein the game session key is created at the first game console or at the server device;
maintaining a record of the game session identifier for the new game session and the game session key for the new game session at the server device;
making the new game session available for one or more other game consoles to join;
receiving, from a second game console, a second request to search the new game session;
identifying, in response to the second request, the new game session; and
communicating information describing the new game session to the second game console such that the second game console establishes a secure communication with the first game console based on the information and the second game console joins a game hosted at the first game console without the second game console being further routed through the server device, wherein a set of application programming interface (APIs) is made available and exposed to the first game console, the second game console and the server device to facilitate:
creation of the new game session at the first game console;
search of the new game session initiated by the second game console; and
communication among the first game console, the second game console and the server device.

8. One or more computer storage media as recited in claim 7, wherein the method further comprises deleting the record when no game consoles are members of the new game session.

9. One or more computer storage media as recited in claim 7, wherein the method further comprises maintaining a record of one or more attributes of the new game session.

10. One or more computer storage media as recited in claim 9, wherein the one or more attributes comprise a skill level of each of one or more players in the game session.

11. One or more computer storage media as recited in claim 7, wherein the method further comprises maintaining a record of a number of slots in the game session that can be filled by invitation only.

12. One or more computer storage media as recited in claim 7, wherein the method further comprises maintaining a record of information regarding the first game console that allows other game consoles to access the first game console, wherein the first game console and each of the other game consoles are each situated behind different network address translation (NAT) devices.

13. One or more computer storage media as recited in claim 7, wherein the method further comprises:
receiving, from the first game console-, an identifier of a location where game data is stored, wherein the identifier comprises the fully qualified address (XNADDR) of the location;
maintaining a record of the location; and
making the game data location available to other game consoles.

14. A method of communicating, over a network, between a match making server and a plurality of game consoles comprising a first and a second game console, the method being implemented in the match making server and comprising:
receiving, at the match making server from the first game console, an acceptance of an invitation to join a game session identifying a game hosted on the second game console and a fully qualified address comprising an XNADDR of the second game console, wherein the game session:
is created and hosted by the second game console and created and communicated through a set of application programming interfaces (APIs) employing one or more match making functionalities between the server device and the second game console; and
comprises one or more public slots that are to be filled by one or more players each searching and joining the game session and one or more private slots that are to be filled by one or more players each accepting the invitation from the second game console;
retrieving, from a database, information describing the game session in response to the received request, the information comprising:
a game session key associated with the game session and created at the second game console-; and
current status of the one or more public slots and the one or more private slots within the game session; and
sending, from the match making server to the first game console, the game session key to be used by the first game console to securely communicate data with the second game console and one or more other game consoles in the game session on the basis of the current status of the one or more public slots and the one or more private slots of the game session, wherein neither the first game console nor the second game console comprises a server device.

15. A method as recited in claim 14, wherein receiving the acceptance of the invitation comprises receiving a session search request including, as a search parameter, a game session ID of the game session.

16. A method as recited in claim 14, further comprising:
receiving a request for game data exchange information from the first game console;
identifying a location of the requested game data; and
sending, to the first game console, an identifier of the location, wherein the identifier comprises the fully qualified address (XNADDR) of the location.

17. A system implemented in a server device, the system comprising:
an interface configured to receive one or more requests from one or more requesting game consoles regarding a plurality of game sessions each hosted by one or more of a plurality of hosting game consoles, and to respond to the one or more requesting game consoles with information regarding one or more of the plurality of game sessions, wherein the interface is implemented by a set of application programming interfaces (APIs) employing one or more match making functionalities between the server device and the one or more requesting game consoles and the one or more of the plurality of hosting game consoles; and a database configured to maintain the information for each of the plurality of game sessions, wherein the information for each of the plurality of game sessions comprises:
- a game session identifier to uniquely identify the game session;
- a fully qualified address comprising an XNADDR;
- information regarding a number of slots configured to be filled by invitation sent from the one or more of the plurality of hosting game consoles only and a number of slot in the game session configured to be filled by the one or more requesting game consoles that join the game session via a match-making search through the server device; and
- a game session key created at one or more of the plurality of hosting game consoles or at the server device to be used by game consoles that are part of the game session to securely communicate with one another.

18. A system as recited in claim 17, wherein the information for each of the plurality of game sessions further comprises information regarding the plurality of hosting game consoles that allows other game consoles to access each of the plurality of hosting game consoles, wherein each of the other game consoles and each of the plurality of hosting game consoles are situated behind different network address translation (NAT) devices.

19. A system as recited in claim 17, wherein the interface is further configured to generate, for each of the plurality of hosting game sessions, the game session identifier and the game session key.

20. One or more computer storage media having stored thereon a plurality of instructions that, when executed by one or more processors, causes the one or more processors to perform a computer-implemented method, the method comprising steps of:
- sending from a hosting game console to a server device, a request that a game session is created and hosted at the hosting game console, the request comprising a game being hosted by the hosting game console and a fully qualified address comprising an XNADDR of the hosting game console, wherein:
  - the game session is created and communicated through a set of application programming interfaces (APIs);
  - the set of APIs is made available and exposed to the game hosted at the hosting game console to facilitate creation of the game session; and
  - the game session comprises information regarding a number of slots configured to be filled by invitation sent from the hosting game console only and a number of slot configured to be filled by one or more other game consoles that join the game session via a match-making search through the server device; and
- receiving, from the server device, both a game session identifier that uniquely identifies the game session and a game session key created at the hosting game console or the server device to be used to securely communicate with other members of the game session.

21. One or more computer storage media as recited in claim 20, wherein the method further comprises sending, as part of the request, one or more attributes of the game session.

22. One or more computer storage media as recited in claim 20, wherein the one or more processors are part of a game console.

23. One or more computer storage media having stored thereon a plurality of instructions that, when executed by one or more processors, causes the one or more processors to perform a computer-implemented method, the method comprising:
- sending from a hosting game console to a server device, a request facilitating a game session being created and hosted at the hosting game console, wherein the request comprises:
  - a game session identifier that uniquely identifies the game session;
  - a fully qualified address comprising an XNADDR of the hosting game console;
  - information regarding a number of slots configured to be filled by invitation from the hosting game console only and a number of slot in the game session configured to be filled by other game consoles that join the game session via a match-making search through the server device; and
  - a game session key created at the hosting game console or the server device and utilized by the hosting game console to securely communicate with other members of the game session;
- wherein the game session is created and communicated through a set of application programming interfaces (APIs) employing one or more match making functionalities between the hosting game console and the server device.

24. One or more computer storage media as recited in claim 23, wherein the method further comprises sending, as part of the request, one or more attributes of the game session.

25. One or more computer storage media as recited in claim 23, wherein the one or more processors are part of the hosting game console.

26. A game console comprising:
- a processing unit;
- a network interface configured to allow communication with other game consoles; and
- a memory configured to store instructions for execution by the processing unit, wherein the instructions cause the processing unit to:
- create and host a game session at the game console, the game session comprising:
  - a title identification (ID) field containing an identifier of a game being hosted at the game console;
  - a host address field containing a fully qualified address comprising an XNADDR of the game console;
  - a game session key created by the game console or a server device and used by the game console in the game session to securely communicate data to each member in the game session; and
  - information regarding a number of slots configured to be filled by a first group of game consoles each receiving an invitation from the game console only and a number of slots configured to be filled by a second group of game consoles joining the game session via a match-making search through one or more server devices;
- submit a request to one of the one or more server devices to make the game session available for one or more from the second group to join; and
- invite one or more of the first group to join the game session.

27. A game console method as recited in claim 26, wherein the game console and the first and second group of game consoles are each situated on a home-based local area network behind different network address translation (NAT) devices.

28. A game console method as recited in claim 26, wherein the fully qualified address (XNADDR) allows each member in the game session to traverse the network address translation devices.

* * * * *